United States Patent [19]

Adams

[11] Patent Number: 4,708,044

[45] Date of Patent: Nov. 24, 1987

[54] KNIFE ASSEMBLY FOR CUTTING SAUSAGE CASINGS

[75] Inventor: John M. Adams, Atlanta, Ga.

[73] Assignee: Atlas Casing Company, Inc., Fairburn, Ga.

[21] Appl. No.: 881,173

[22] Filed: Jul. 1, 1986

[51] Int. Cl.⁴ .............................................. A22B 5/00
[52] U.S. Cl. .......................................... 83/545; 17/12; 30/290
[58] Field of Search .......................... 30/287, 290, 347; 17/43, 52, 67.1 F, 12; 83/676, 777, 926 A, 545

[56] References Cited

U.S. PATENT DOCUMENTS 1,493,354  5/1924  Linnehan ............................... 30/290
4,077,124  3/1978  Christmann ........................... 30/287

Primary Examiner—Douglas D. Watts
Attorney, Agent, or Firm—Lowe, Price, LeBlanc, Becker & Shur

[57] ABSTRACT

A device for cutting animal intestines into predetemined length for use as sausage casings comprises a pair of upstanding L-shaped mounting plates between which a circular shaped knife is secured. The top edge of the mounting plates is formed with a groove through which the knife cutting edge extends. In use, intestinal tissue is squarely cut by throwing a length thereof onto a central top edge of the mounting plates for movement in the direction of the groove. The intestine enters the groove and descends to a point where the cutting edge intersects one of the groove walls at an acute angle where cutting occurs. This groove wall is bevelled with respect to the knife to slice the casing material quickly in a square cut. Fresh cutting edges may be exposed in the groove by rotating the knife when necessary.

14 Claims, 6 Drawing Figures

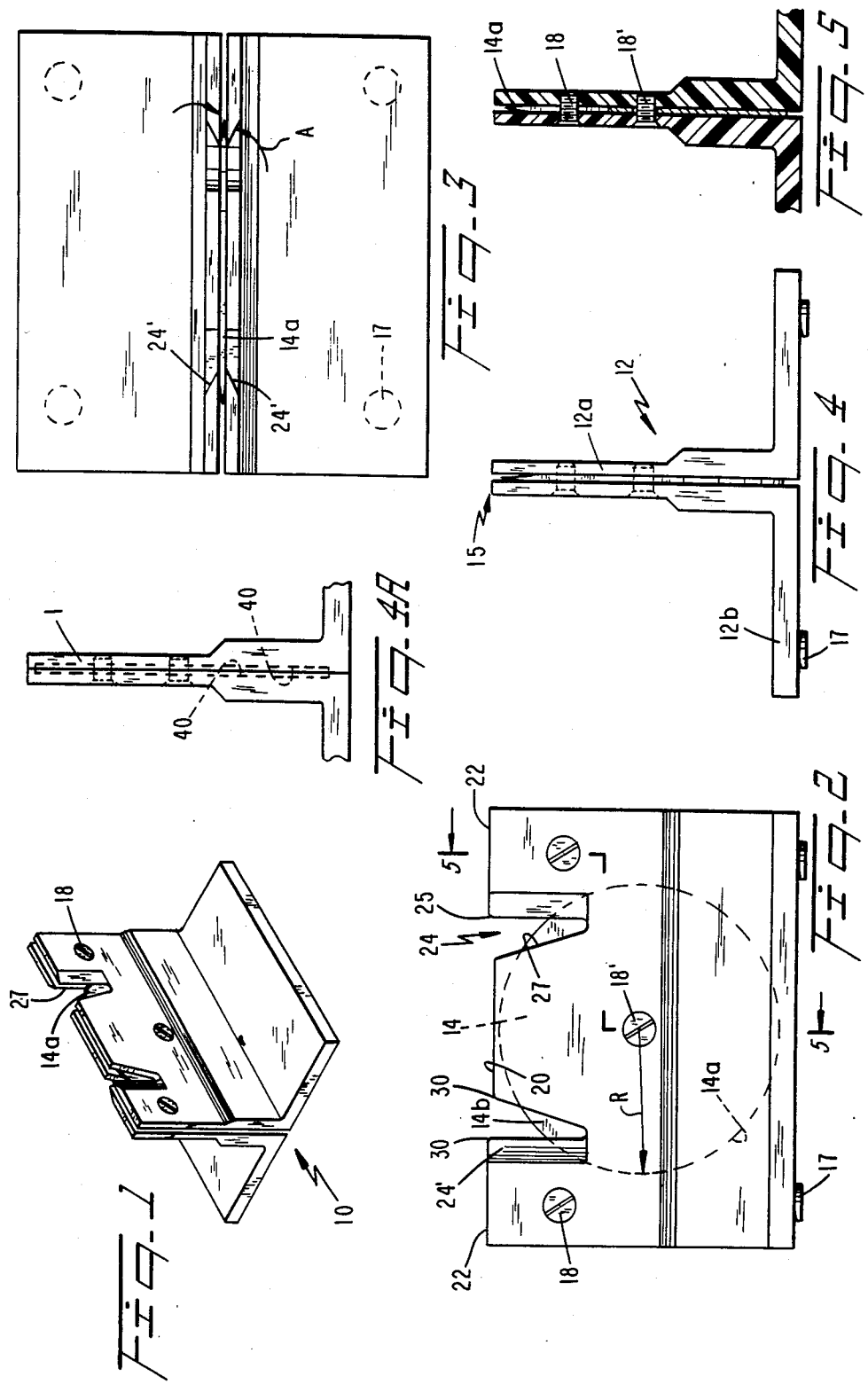

KNIFE ASSEMBLY FOR CUTTING SAUSAGE CASINGS

TECHNICAL FIELD

The present invention relates generally to cutting devices and, more particularly, to a knife assembly for cutting animal intestinal tissue into predetermined lengths for use as sausage casings.

BACKGROUND ART

Intestines from lamb, sheep, hog and beef are used throughout the world for stuffing with chopped-up meat and other ingredients for consumption as sausage. Commercially, these intestines when cut to desired length are known as casings. After the intestines are removed from the animal and cleaned, the intestinal tissue is checked for quality and calibrated for diametral size, i.e., 22/24, 24/26, 35/37, 39, 42 millimeters, to accommodate the specifications of individual sausage manufacturers. Calibration for diameter and quality occurs in a known manner by inflating the intestine or casing with pressurized water or air measurable parts of sheep intestine average about 28-30 yards, hog approximately 17 yards with end to end diametral changes varying as much as 30-40%) and checking the diameter with a standard measuring gauge. In this manner, intestinal lengths may be calibrated as, for example, a 34/36 millimeter selection, and thereafter cut into predetermined casing lengths. Unusable parts of intestine may also be removed by cutting.

In the manufacture of sausage casings, it is important that the casings be cut squarely since when the wet casing (which is slippery and made of a very strong connective tissue known as Collagen) is inserted on a stuffing horn, this must be rapidly accomplished by an operator who by the flick of his fingertips must locate the opening or mouth of the casing and slip it onto the stuffing horn enabling the rest of the casing to be pulled onto the horn. If the casing is not cut squarely, the operator will find it difficult to locate the casing mouth, losing precious seconds, which is in turn reflected down the production assembly line. This loss of production time is crucial considering that an operator will normally work with approximately several hundred to several thousand casings daily. As the term is used in the present specification, a "square cut" means that the entire annular end portion of the wet casing is located in a plate extending substantially perpendicular to the longitudinal axis of the casing.

Known cutting knives presently used for cutting sausage casings are generally unsatisfactory for several reasons. One problem, for example, is that these cutting knives generally utilize either a regular, single or double shearing blade that is susceptible to breaking and that is often counted in an unsafe, exposed manner, causing injury the operator's hands. Such knives also tend to be subject to corrosion and are often difficult to clean. The cutting edge of these prior art knives wear quickly and are difficult to replace in a rapid manner.

One knife construction of which I am aware comprises a straight knife blade exposed within a groove of a metal post. This mounting arrangement results in a ruptured or jagged cut, instead of the desired square cut, and the groove is subject to clogging. This type of knife is also difficult to re-sharpen or clean and, after several sharpenings, the space between the knife edge and groove increases, rendering the knife useless.

DISCLOSURE OF THE INVENTION

It is accordingly one object of the present invention to provide a cutting device in the form of a circular knife blade having a peripheral cutting edge exposed within a groove and wherein the knife is rotatable to quickly rotate fresh cutting edges into the cutting groove.

Another object of the invention is to provide a groove configuration conducive to square rotting of the casings with the exposed cutting edge in a manner that is safe for the operator and avoids clogging of the groove.

Still a further object is to provide a cutting device that is sanitary to use and easy to clean.

Yet another object is to provide a mounting arrangement for a circular knife that is inexpensive to manufacture and provides stable support for the cutting edge in operation.

A device for cutting sausage casings, in accordance with the present invention, comprises a circular shaped knife having a peripheral cutting edge vertically mounted upon a mounting plate having an upwardly directed edge formed with a groove into which extends a part of the cutting edge. The knife may be attached to the mounting plate with screws. If only one of the screws passes through the center of the circular knife, loosening of the screw enables a fresh peripheral cutting edge to be rotated into the groove in a fast, reliable manner prior to re-tightening.

Preferably, the cutting device includes a pair of L-shaped mounting plates, each having a first mounting plate portion and a second portion formed orthogonally thereto. The first mounting plate portions sandwich the circular knife therebetween. The second portions extend in opposite directions to each other to define a support base.

The upwardly directed edge defined by the top edge of the mounting plates can include a centrally located first horizontal top edge terminating in an inclined wall defining a first surface of the groove. The top edge further includes a laterally located second horizontal top edge spaced from the first horizontal top edge by the groove. The second horizontal top edge terminates in a second wall defining a second surface of the groove extending downwardly to intersect the first surface at the bottom of the groove. The cutting edge extends through the groove between the top and bottom thereof.

The first surfaces are generally orthogonal to the plane of the knife. The second surfaces are bevelled away from the knife defining a bevelled edge of approximately 30°. In use, the operator "throws" a portion of the casing desired to be cut onto the first horizontal top edge and then directs the material by holding lengths thereof on opposite sides of the mounting plates, towards the groove. As the material enters the groove, it moves along the cutting edge towards the bevelled surface against which a square cut is achieved at the point of intersection with the knife.

Since the act of "throwing" the casing onto the central horizontal top edge and moving the casing rapidly over the top edge towards the groove (and operator) occurs in a rapid manner, there is a tendency for the casing to "skip" over the groove without entering into contact with the cutting edge. To avoid this, the central horizontal top edge is of lesser height than the laterally spaced horizontal top edge whereby the latter presents a vertical stop surface (formed immediately below the lateral top edge relative to the height of the central top edge) against which the casing will strike to be directed downwardly towards the cutting edge. This stop surface is actually the upper part of the bevelled second surface, thereby assuring reliable contact between the bevelled surface and cutting edge to achieve a square cut.

Since the thickness of the circular knife is preferably about ⅛ inches, sandwiching of the knife between the two L-shaped mounting plates causes the bevelled edges to be spaced from each other by the knife thickness which allows intestinal residue to become entrapped between the mounting plates which is difficult to clean. To avoid this problem, the vertical opposing surfaces of the mounting plates may each be formed with a cylindrical recess having a diameter slightly greater than the knife diameter and a depth equal to approximately ½ the knife thickness. In this manner, the circular knife may be retained exclusively within the facing cylindrical recesses so that the bevelled edges are in contact with each other without an undesirable space therebetween.

It is within the scope of the present invention to utilize a knife having a straight cutting edge mounted to extend within a groove having a bevelled edge intersecting the cutting edge at the point where cutting occurs to achieve a square cut.

If desired, the mounting plates employed in the present invention may be formed with a pair of grooves on opposite sides of the central top edge, respectively. This allows two operators to employ the same cutting device during simultaneous cutting operations. Alternatively, one operator may utilize the cutting device; when the cutting edge in one of the grooves wears excessively, the operator may switch to the second groove until excessive wear occurs. This minimizes down time in the cutitng operation. However, when it is necessary to expose a fresh cutting edge, this is easily accomplished by loosening the knife retaining screw to rotate the knife over a slight angular interval simultaneously exposing a fresh cutting edge in each of the two grooves.

Additional objects, advantages and novel features of the invention will be set forth in part in the description which follows and in part will become apparent to those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWING

FIG. 1 is a perspective view of a cutting device in accordance with the present invention;

FIG. 2 is a right side elevational view of the cutting device of FIG. 1;

FIG. 3 is a top plan view of the cutting device of FIG. 1;

FIG. 4 is an end view of the cutting device of FIG. 1;

FIG. 4A is an end view of a second embodiment of the cutting device of FIG. 1; and FIG. 5 is a sectional view taken along the line 5-5 of FIG. 2.

BEST MODE FOR CARRYING OUT THE INVENTION

Referring to FIGS. 1, 2 and 4, cutting device 10 of the present invention comprises a pair of L-shaped mounting plates 12 connected together with screws 18, and a circular shaped knife 14 having a peripheral cutting edge 14a secured between the xounting plates with screw 18' passing through the center of the knife. The upwardly directed surface 15 of mounting plates 12 includes a pair of identical grooves 24 in which are exposed portions 14b of peripheral cutting edge 14a.

In use, an operator will stand either to the left or right of cutting device 10 (as depicted in FIG. 2), facing towards the cutting device to obtain a profile view thereof (FIGS. 1 and 4). Facing cutting device 10, the operator aligns his or her body with a central axis of the cutting device passing along the chord of knife 14. While gripping a section of casing (not shown) to be cut, the operator "throws" the casing onto central horizontal top edge 20 of mounting plates 12 (with the operator's hands gripping the casing disposed on opposite left and right hand sides of the cutting device) and proceeds to draw the casing along the top edge 20 into groove 24 in closest proximity to the operator. As the casing travels through the groove towards the exposed peripheral cutting edge, the casing stretches over bevelled surfaces 24' to descend into contact with the exposed cutting edge. This bevelled edge 24' forms a sharp edge descending towards the cutting edge enabling the casing to be cut squarely in a desired manner.

Each L-shaped mounting plate 12 has a vertical mounting plate portion 12a and a horizontal plate portion 12b defining a support base when the plates are secured together in the FIG. 4 position. Rubber feet 17 may be fixed to the underside of the base to prevent slippage. Screws 18 are preferably fixed closely adjacent the bevelled surfaces in approximately the same elevational position as the point of intersection of the cutting edge with the bevelled surfaces to ensure that the bevelled surfaces are clamped tightly together against the knife. In FIG. 5, a single screw 18' connects the knife 14 to the vertical mounting plates. By loosening the single screw 18', and to some extent the screws 18, it will be appreciated that knife 14 may be rotated to expose fresh cutting edges within grooves 24.

Preferably, screws 18,18' are symmetrically mounted with respect to each other to provide maximum clamping effect of the knife between the mounting plates while securely clamping the bevelled edges together. Although not necessary, the screw heads may be countersunk (FIG. 5) to avoid injurious contact with the operator's hands during the cutting operation.

With reference to FIG. 2, the central horizontal top edge 20 is preferably of lesser height than lateral horizontal top edges 22 respectively formed on opposite sides of the grooves. This feature is advantageous to prevent the casing thrown onto the central edge 20 from skipping over the groove as the casing is rapidly directed by the operator towards the groove. In other words, this difference in height establishes an abutment surface 25 (i.e., that part of the uppermost edge of the bevelled surface extending above the height of top edge 20) against which the casing will strike to descend into contact with the cutting edge.

The bevelled surfaces preferably form an angle A with the plane of knife 14 in the approximate range of 20-45°, and preferably 30°. Through experimentation, it has been determined that an angle of 30° provides the most consistently reliable square cut in cooperation with cutting edge 14a.

The inclined groove walls 27 extending downwardly from top edge 20 towards the bottom of the groove may be orthogonal relative to the plane of knife 14. These inclined edges 27 merely direct the casing towards cutting edge 14a. No cutting occurs on these inclined edges.

The height of central top edge 20, as measured from the center of circular knife 14, is greater than the radius R of the circular knife so that the outer periphery thereof is safely recessed below the top edge (FIG. 2). Similarly, the height of vertical mounting plate sections 12a, as measured from the lower surface of horizontal base sections 12b, is greater than the radius R of circular knife 14 to safely recess the knife within the mounting plate arrangement (FIG. 5). In other words, the only exposed cutting edges are within grooves 24. By dimensioning the mouth of each groove (as measured between top edges 20,22) to be smaller than the width thickness of the operator's finger, the knife is safely disposed to ensure maximum cutting effectiveness without possible injury to the operator. The width of the groove mouth may be $\theta$ to $\frac{1}{2}$ inch and preferably $\frac{3}{8}$ inch to accomplish that purpose.

As depicted in FIG. 2, the innermost vertical edge of the bevelled groove surfaces 24' preferably forms an acute angle with peripheral cutting edge 14b to ensure that the casing is positively directed into square cutting contact with the knife edge.

The corners 30 respectively formed between top edges 20,22 with their associated groove walls are preferably rounded to prevent injury to the operator.

With the present invention, the length L of cutting edge 14a can be determined from the following formula:

$$L = \pi R$$

wherein R = the radius of knife 14
if $C_1$ = the exposed length of cutting edge 14b within a groove 24, then
$L/C_1$ = the number of cutting edges provided by a single knife 14 that may be indexed into groove 24 before the knife loses its entire circumferential cutting edge.

In the preferred embodiment, approximately eight fresh cutting edges may be provided for each groove 24 before knife 14 requires re-sharpening. In addition, the knife 14 may be re-sharpened several times before peripheral cutting edge 14a descends below the level of the bevelled groove edges.

L-shaped mounting plates 12 are preferably durable transparent plastic. Screws 18,18' and knife 14 are preferably non-magnetic, high-grade stainless steel. Rubber feet 16 may be neoprene rubber buttons preventing the base from sliding on a wet table.

In the FIG. 4 embodiment of the present invention, a gap 27 tends to be formed between adjacent bevelled surfaces 24' as a result of knife 14 being sandwiched between vertical mounting plate portions 12a. Since intestinal residue tends to enter between plate portions 12a through gap 27 during the cutting process, frequent cleaning of the cutting device 10 is necessitated. To avoid this problem, vertical mounting plate portions 12a may each be formed with a cylindrical recess 40 (FIG. 4A) having a diameter approximately equal to the diameter of knife 14 and a depth equal to approximately $\frac{1}{2}$ the knife thickness. In this manner, knife 14 is enclosed within the cylindrical recesses 40 with the result that bevelled edges 24' are in contact with each other with no gap formed therebetween.

The foregoing description of a preferred embodiment of the invention has been presented for purposes of illustration and description. It is not intended to be exhaustive or to limit the invention to the precise form disclosed, and obviously many modifications and variations are possible in light of the above teaching. This embodiment was chosen and described in order to best explain the principles of the invention and its practical application to thereby enable others skilled in the art to best utilize the invention and various embodiments and with various modifications as are suited to the particular use contemplated. It is intended that the scope of the invention be defined by the claims appended hereto.

I claim:

1. A cutting device, comprising:
   (a) a generally circular shaped knife having a peripheral cutting edge;
   (b) means for mounting said knife in a cutting position, said mounting means including a first mounting plate portion having an upwardly directed edge formed with a groove into which extends a part of said cutting edge; and
   (c) means for attaching said knife in stationary position to said mounting plate, said attaching means being movable to enable rotation of a fresh cutting edge into the groove;
   (d) wherein said mounting means includes a pair of generally L-shaped mounting plates each having said first mounting plate portion and a second portion formed substantially orthogonally to the first portion, said first mounting plate portions thereof sandwiching said circular knife therebetween and being connected together with screw means, said second portions extending in opposite directions to each other to define a support base wherein said upwardly directed edge defined by the top edges of said first mounting plate portions includes a generally centrally located first substantially horizontal top edge terminating in an inclined wall defining a first surface of said groove, said upwardly directed edge further including a laterally located second substantially horizontal top edge spaced from the first horizontal top edge via said groove, said second horizontal top edge terminating in a second wall defining a second surface of said groove extending downwardly to intersect said first surface at the bottom of said groove, said cutting edge extending through the groove below the top and bottom thereof.

2. The cutting device of claim 1, wherein said first surface is generally orthogonal to the plane of said knife.

3. The cutting device of claim 1, wherein said second surface is bevelled in the direction towards said knife.

4. The cutting device of claim 3, wherein the bevelled edge of said second surface forms an angle of approximately 30° with the plane of said knife.

5. The cutting device of claim 1, wherein the width of the groove mouth spaced above the cutting edge is less than the thickness of an operator's finger to prevent injury.

6. The cutting device of claim 5, wherein the width of the groove mouth is approximately $\frac{3}{8}$ inch.

7. The cutting device of claim 1, wherein corners at which the first and second surfaces respectively intersect the first and second horizontal top edges are rounded to prevent injury to the operator.

8. The cutting device of claim 1, wherein the first horizontal top edge is of lesser height than the second horizontal top edge.

9. The cutting device of claim 2, wherein said second surface is substantially vertical to form an acute angle with the cutting edge.

10. The cutting device of claim 1, wherein said screw means includes plural screws for fastening said first mounting plate portions together, only one of said screws passing through the knife and through the center thereof, said knife thereby being rotatable about upon loosening said screw.

11. The cutting device of claim 3, wherein each first mounting plate portion includes a circular recess having a thickness equal to about ½ the thickness of said circular knife so that said circular recesses form a cavity substantially entirely containing said knife when the circular recesses face each other in assembled relationship so that beveled edges of said first mounting plate portions intimately contact each other to prevent debris from material being cut from entering between said first mounting plate portions.

12. The cutting device of claim 1, wherein said groove includes a pair of generally identical grooves each formed on opposite sides of said centrally located first substantially horizontal top edge.

13. A cutting device comprising:
(a) a knife having a cutting edge;
(b) means for mounting said knife in a cutting position, said mounting means including an upwardly directed edge formed with a groove located between opposite ends of said edge, said groove being defined by a pair of walls extending downwardly from said upwardly directed edge, one of said walls having an edge, towards which material to be cut is moved, intersecting the cutting edge at an acute angle, said one of said walls being beveled with respect to the cutting edge; and
(c) means for attaching the knife to said mounting means wherein said mounting means includes a pair of mounting plate portions secured together with each mounting plate portion including a recess in one face thereof having a thickness equal to about half the thickness of said knife so that said recesses form a cavity substantially entirely containing said knife when the recesses face each other in assembled realtionship so that the beveled edges of said first mounting plate portions intimately contact each other to prevent debris from material being cut from entering between said first mounting plate portions.

14. The cutting device of claim 13, wherein said groove includes a pair of generally identical grooves each formed on opposite sides of said centrally located first substantially horizontal top edge.

* * * * *